United States Patent [19]
Price

[11] Patent Number: 5,836,490
[45] Date of Patent: Nov. 17, 1998

[54] TRUCK BED BICYCLE RACK

[76] Inventor: Brent A. Price, 1211 Bonfoy Ave., Colorado Springs, Colo. 80909

[21] Appl. No.: 869,827

[22] Filed: Jun. 5, 1997

[51] Int. Cl.[6] ....................................................... B60R 9/00
[52] U.S. Cl. ........................................... 224/403; 224/924
[58] Field of Search ..................................... 224/403, 405, 224/924; 410/3, 143, 145–8; 296/37.6, 3

[56] References Cited

U.S. PATENT DOCUMENTS

| | | | |
|---|---|---|---|
| 4,396,324 | 8/1983 | Ellis | 296/3 X |
| 4,823,997 | 4/1989 | Krieger | 224/924 |
| 4,934,572 | 6/1990 | Bowman et al. | 224/403 X |
| 5,092,504 | 3/1992 | Hannes et al. | 224/403 |
| 5,445,300 | 8/1995 | Eipper et al. | 224/924 |

*Primary Examiner*—Renee S. Luebke
*Attorney, Agent, or Firm*—Richard W. Hanes

[57] ABSTRACT

A bicycle rack adapted to be installed in a truck bed defined by at least a floor, an upstanding forward end wall and at least one upstanding sidewall. The rack includes an elongated rod secured at one of its ends to the forward end wall of the truck bed while the other end of the rod is secured to the rearward portion of the sidewall. A pair of spaced apart wheel retaining bails are slidably carried by the rod so that the distance therebetween can be adjusted to accommodate the wheel base of different type of cycles.

3 Claims, 4 Drawing Sheets

TRUCK BED BICYCLE RACK

The present invention relates generally to a rack for holding and transporting a bicycle and more specifically, such a rack adapted to be mounted in the bed of a truck, such as a pick-up truck.

BACKGROUND OF THE INVENTION

Having the empty space of the cargo bed of a pick-up truck available to transport a bicycle would seem to be the ultimate solution of how to transport a bike. That is true, however, only if one does not care if the bicycle slides around the floor of the bed or if other cargo is not to carried in the bed along with the bike. In each of these later cases, it is most desirable to have a mounting rack in the pick-up bed which can secure the bicycle in a single position, while at the same time conserving the maximum amount of bed floor area and available cargo volume for other goods.

This inventor is not the first to recognize the need. Others, including this inventor, have been awarded U.S. patents for various types of apparatus intended for securing a bicycle in, on, or about a pick-up truck bed.

This inventor's prior U.S. Pat. No. 5,303,858 is the most pertinent of the similar devices. In that patent, there is disclosed a combination bicycle and cargo rack. The bicycle portion is intended to hold the bicycle outside of the bed and includes a supporting structure that doubles as a support for other cargo, such as a canoe. The apparatus of the present invention is simpler and more efficient because it eliminates the supporting structure and places the bicycle more conveniently within the space of the cargo bed.

U.S. Pat. No. 5,014,890 discloses a strap which traverses the width of the cargo bed of a pick-up truck, which strap has a clamp or clamps which secure one or more bicycles. Such a device does not preserve the cargo space for other material. and provides little, if any, vertical support for the bike/s, U.S. Pat. No. 5,127,564 again discloses a support member which is laterally disposed across the width of the truck bed, which device consumes space and interferes with the loading of other goods in the bed of the truck.

In view of the shortcomings of the prior art devices in this particular field, it is the primary object of the present invention to provide a bicycle rack for the bed of a truck that is disposed longitudinally of the truck bed and consumes a minimum of cargo space itself.

Another object of the invention is to provide a bicycle rack wherein the bicycle itself requires very little additional cargo space than that taken up by the rack.

A further object of the invention is to provide a bicycle rack for a truck bed that can be easily and quickly installed and removed from the bed.

A still further object of the invention is to provide a bicycle rack of the type described that will hold the bicycle securely in a vertical position for transport, without having to remove or disassemble any portion of the bike, and which will allow quick and easy insertion of the bicycle into the rack and equally efficient removal of the bicycle therefrom.

Other objects, features and advantages of the present invention will become apparent upon a reading of the following detailed description of a preferred form of the invention taken in conjunction with the attached drawings.

DETAILED DESCRIPTION

Figure 1:
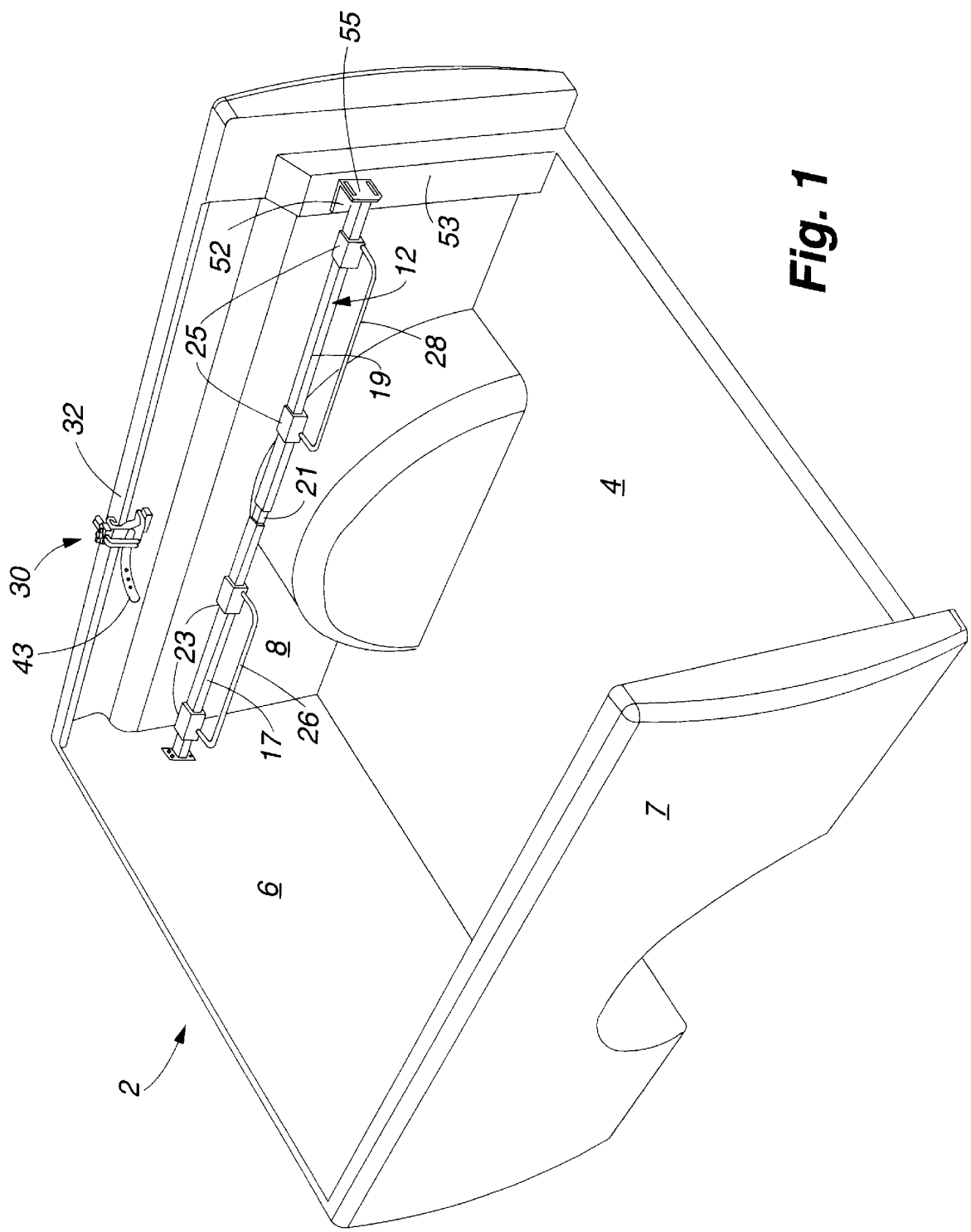
FIG. 1 is a perspective view of the cargo bed of a typical pick-up truck (without the tailgate in order to more clearly reveal the structure of the invention) showing the bicycle rack of the present invention installed along the side of the bed.

For a detailed description of the present invention, reference is first made to FIG. 1. A typical pick-up truck cargo bed 2 is shown, however the normally present tailgate is omitted for clarity. The bed of the truck comprises a floor 4, a forward upstanding wall 6 and opposed spaced apart side walls 7 and 8. Each of the side walls has an overturned flange, or similar construction, forming a top edge rail. In the particular construction shown, the rear portion of each side wall is provided with a vertical box beam 53 which lies against the side wall 8 and extends laterally into the truck bed. Other constructions of the side wall 8 are probable, but the illustrated construction will serve to describe the method of attachment of the rack to the truck bed.

The bicycle rack of the present invention includes a basic framing bar, or rod, 12 which carries a pair of spaced apart wheel holding bails 26 and 28. The rod 12 can be of several configurations, but preferably it comprising two rigid tubular members 17 and 19 that are interconnected by a smaller inside telescoping tube 21. The inside telescoping tube 21 is made long enough to allow for adjustment of the total length of the rod as the outside members are pulled away from each other, relying on the support provided by the inside tube 21. The shortest rod length is that at which the two outside tubular members are abutted.

Fitted over the outside of each of the tubular members 17 and 19 are a pair of slidable tubular collars 23 and 25. Welded or otherwise attached to the lateral side of each of the pairs of collars, on the side of the collars facing the interior of the truck bed, is a "U" shaped bail 26 and 28. As shown particularly in FIG. 2, these bails hold the wheels of the bicycle 29. Obviously, the width of the bails, between the upright stems of the "U", is less that the diameter of the bicycle wheel. Different bicycles have different length dimensions between the hubs of the wheels. To accommodate that difference each pair of collars that together carry one bail, may be slid forward or aft in order to vary the spacing between the bails, thus permitting adjustment for various bicycles. The collars may be provided with a locking device, such as a set screw, in order to keep them in a selected position on the rod 12.

Figure 3:
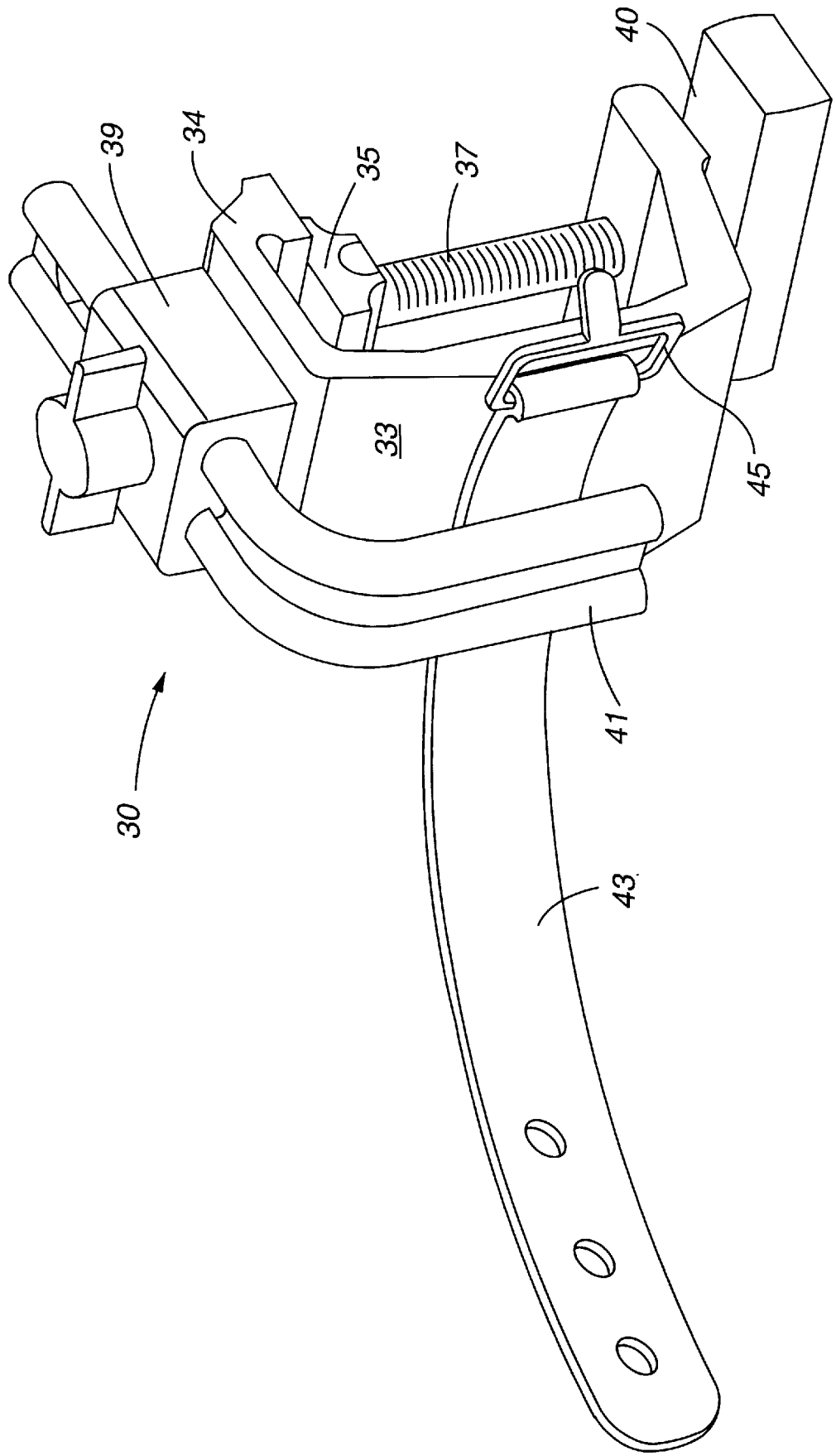
FIG. 3 is an enlarged perspective view of the clamp that is shown in FIGS. 1 and 2 as being mounted on the flanged rail forming the top edge of the upstanding side of the bed.

Provided the bails are of sufficient length to allow the bicycle wheels to sink deeply into the bails 26, and 28, the bails by themselves will support the bicycle. However, it is desirable to provide an additional anchor that will insure the stability of the bicycle in the rack. To that end, a fastener 30 is clamped onto the upper rail 32 of the side 8. Referring to FIG. 3, the fastener 30 is seen to include a C-clamp 33 having a fixed jaw 34 and a movable jaw 35 that is attached to a threaded screw member 37 having a turning handle 40.

Figure 2:
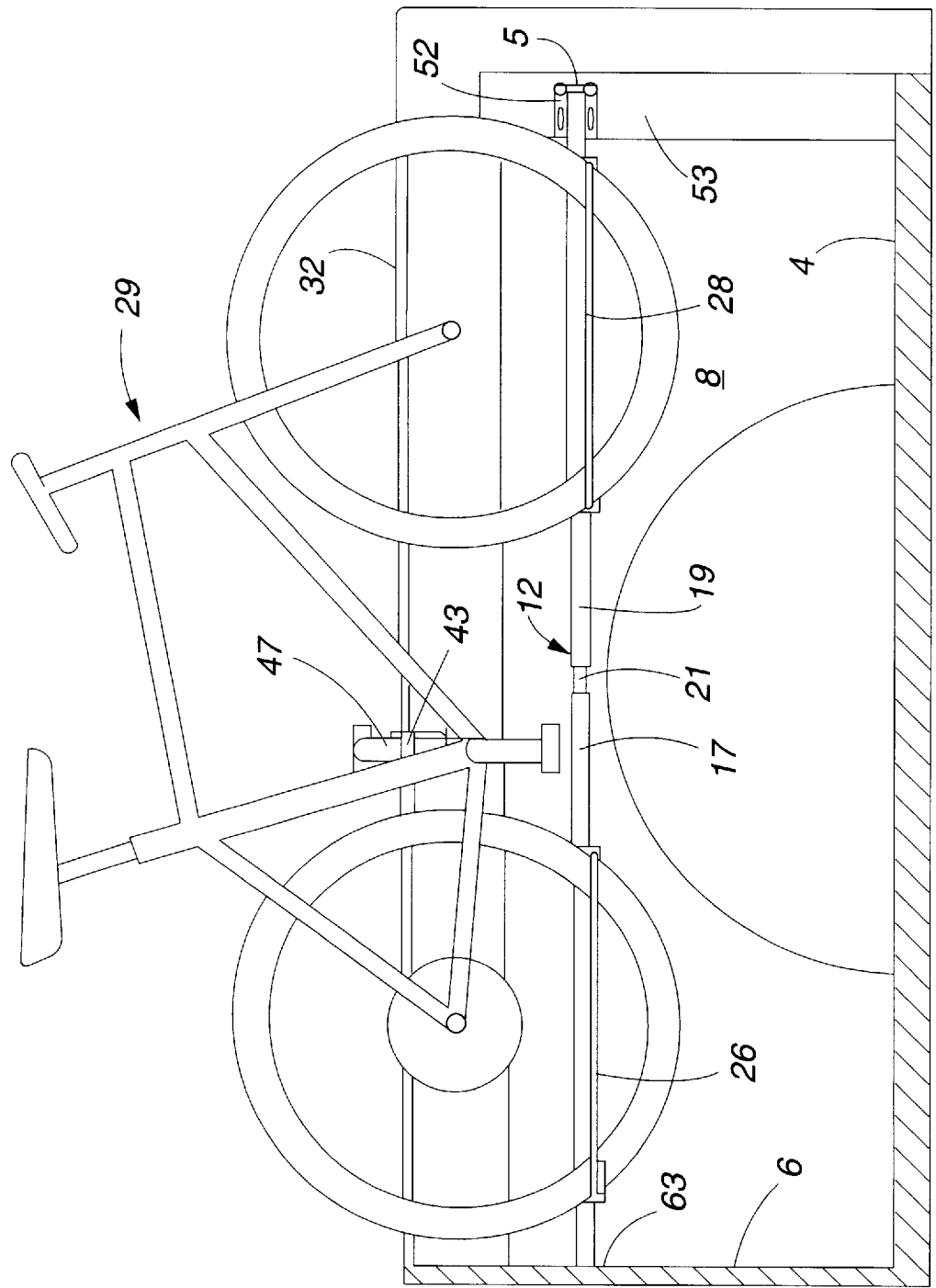
FIG. 2 is a longitudinal cross section of the pick-up truck bed of FIG. 1 and showing, diagrammatically, a bicycle secured in place in the rack of the present invention.

The fixed jaw 34 of the C-clamp is positioned around and over the edge of the rail 32 and the screw member 37 is tightened so as to move the jaw 35 against the underside of the rail to secure the C-clamp in the desired position on the rail. Attached to the top of the C-clamp's fixed jaw 34 is a mounting block 39 that carries a depending bracket arm 41. The arm 41 serves a purpose which is not integral to the bicycle rack claimed in this application. A strap 43 having a buckle 45, or similar clasping device, such as VELCRO, a snap or a tie, is attached to the back side of the C-clamp and positioned between the C-clamp and the depending bracket arm 41. With the fastener 30 positioned on the rail 32 at a point opposite some substantially vertically oriented part of the bicycle, such as the pedal arm 47, the strap 43 may be wrapped around that bicycle part and fastened, thus securing an upper portion of the bicycle tightly to the side 8 of the truck bed. The drawing of FIG. 2 shows the strap 8 being tied around the outside pedal arm 47, for example.

Figure 4:
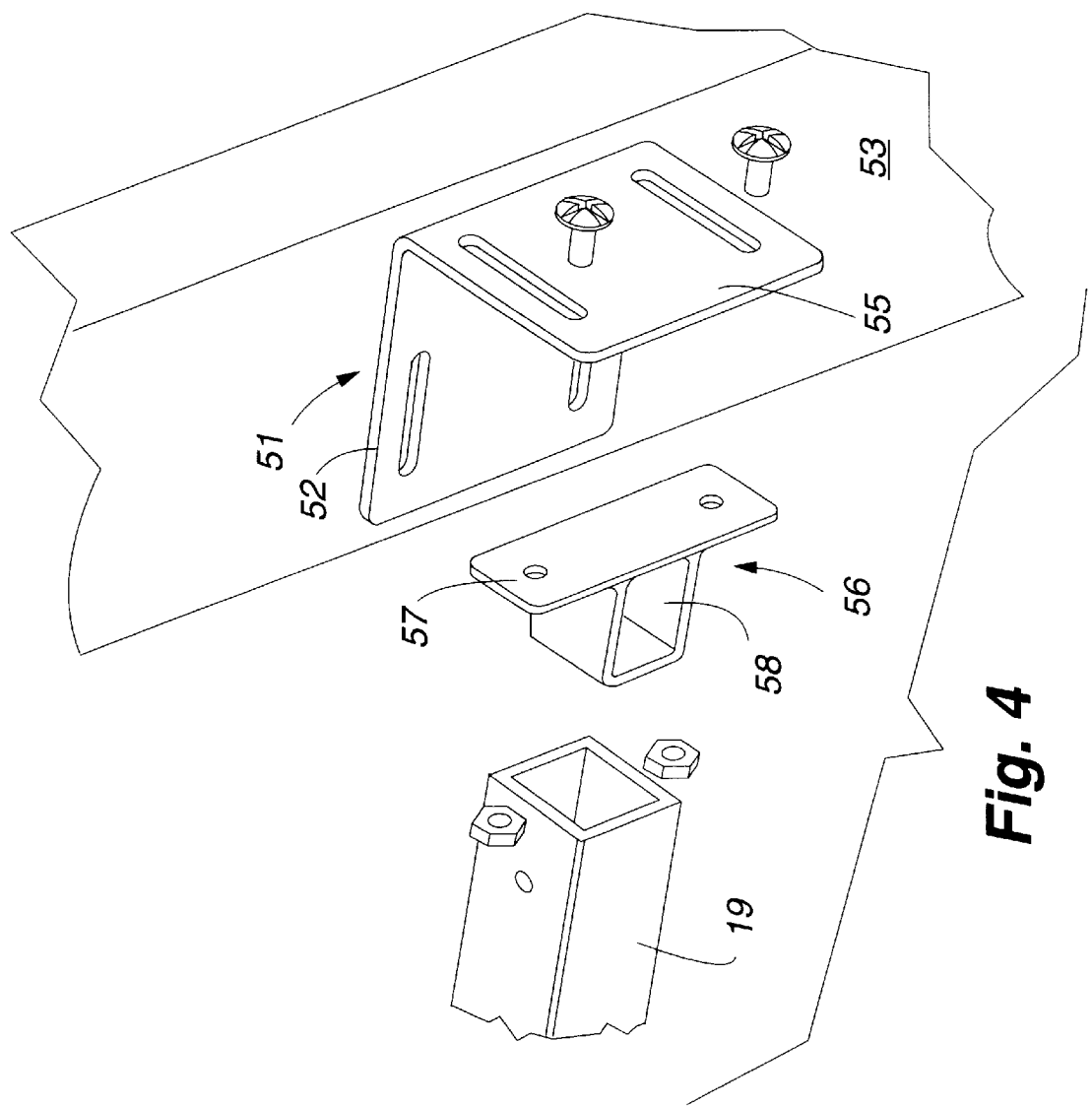
FIG. 4 is an enlarged perspective exploded view of the rearward end of the bicycle mounting rack showing the detail of its construction.
Figure 5:
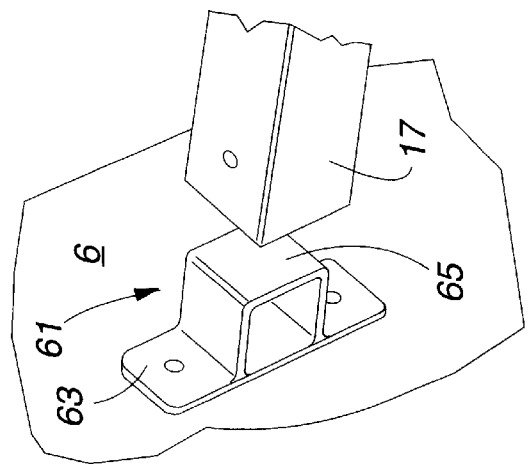
FIG. 5 is an enlarged perspective exploded view of the forward end of the bicycle mounting rack showing the detail of its construction.

The preferred method of mounting the rack in the bed of the pick-up truck is illustrated in FIGS. 4 and 5. FIG. 4 illustrates the rearward mounting. The first leg 52 of an "L" shaped bracket 51 is screwed, bolted or otherwise affixed to a box beam 53 which is integral with and extends from the sidewall 8 inwardly toward the interior of the truck bed. If a particular truck bed is not provided with the box beam, or something similar, it may be necessary to supply a spacer between the "L" shaped bracket and the side 8 of the bed. This is necessary in order that the rod 12 may be mounted sufficiently distant from the side wall 8 as to create the necessary space for the bicycle parts and to position the rod 12 parallel with the truck bed side 8.

A "U" shaped plug bracket 56, having a backing plate 57 is adapted to be attached by screws to the second leg 55 of the side mounted "L" bracket 51. The "U" shaped portion 58 of the plug bracket is sized and dimensioned to fit snugly into the rectangular tubing 19 that forms the rear segment of the framing rod 12, thus securing the rear end of the rod 12 to the rearward portion of the side wall 8. Assuming the "L" shaped bracket 51 is permanently affixed to the box beam attached to the side 8 of the truck bed, the rear end of the rod 12 can be installed by merely attaching the backing plate 57 to the second leg.

As shown in FIG. 5, a plug bracket 61 with a backing plate 63 is adapted to fit snugly within the tubing 16 that forms the forward segment 17 of the framing rod 12. The backing plate can be screwed, bolted or otherwise fixed to the rear facing surface of the forward bed wall. To install the bar 12, the forward end of the bar is pressed onto the "U" shaped portion 65 of the forward plug bracket 61. The rearward end of the bar 12 is then connected to the side wall 8, as described above in connection with the illustration of FIG. 4. If desired, the fastening device illustrated in FIG. 3 is mounted on the side wall rail.

To place the bicycle in the rack, the bicycle wheels are lowered into the bails and the frame or pedal arm is secured by the fastening device. Removing the bicycle from the rack requires only that the fastening device be released and the bicycle lifted out of the bails.

I claim:

1. A bicycle rack adapted to be installed in a truck bed defined by at least a floor, an upstanding forward wall and one upstanding sidewall, comprising, an elongated rod having forward and rearward ends, means for detachably securing the forward end of the rod to the forward wall of the bed, means for detachably securing the rearward end of the rod to the sidewall of the bed, a pair of spaced apart bails carried by the rod and extending laterally of the rod; and fastening means adapted to be clamped to the sidewall for attachment to the bicycle.

2. The combination of claim 1, wherein the bails are slidably carried on the rod.

3. A bicycle rack adapted to be installed in a truck bed defined by at least a floor, an upstanding forward wall and one upstanding sidewall, comprising, an elongated rod having forward and rearward ends, means for detachably securing the forward end of the rod to the forward wall of the bed, means for detachably securing the rearward end of the rod to the sidewall of the bed, a pair of spaced apart bails carried by the rod and extending laterally of the rod, fastening means adapted to be clamped to the sidewall for attachment to the bicycle, and wherein the rod comprises telescoping tubing members which can be adjusted to fit the length of the bed.

\* \* \* \* \*